Feb. 20, 1923.

H. J. DOUGHTY.
TIRE.
FILED AUG. 12, 1918.

1,446,165.

Inventor:
Henry J. Doughty,
by Emery, Booth, Janney and Varney
Attys.

Patented Feb. 20, 1923.

1,446,165

UNITED STATES PATENT OFFICE.

HENRY J. DOUGHTY, OF PROVIDENCE, RHODE ISLAND, ASSIGNOR TO DOUGHTY TIRE COMPANY, OF PORTLAND, MAINE, A CORPORATION OF MAINE.

TIRE.

Original application filed December 17, 1915, Serial No. 67,465. Divided and this application filed August 12, 1918. Serial No. 249,437.

*To all whom it may concern:*

Be it known that I, HENRY J. DOUGHTY, a citizen of the United States, and a resident of Providence, in the county of Providence and State of Rhode Island, have invented an Improvement in Tires, of which the following description, in connection with the accompanying drawings, is a specification, like characters on the drawings representing like parts.

This invention relates to tires of the so-called cord type wherein the body of the tire is formed of comparatively large cords instead of woven fabric, these cords being unwoven or at most lightly held together by occasional threads. This application is a division of my application Serial No. 67,465, filed Dec. 17, 1915.

My invention will best be understood by reference to the following description taken in connection with the accompanying drawing wherein.

Figure 1:
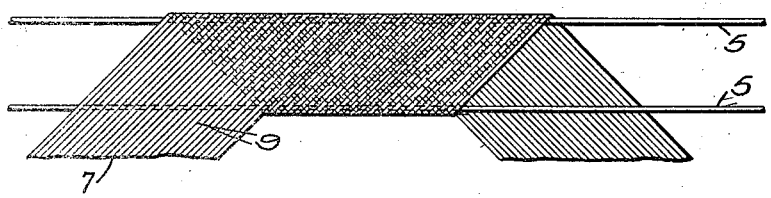
Figure 1 is a view in plan illustrating the material or "fabric" from which my tire is made.

In accordance with my invention I take two strands or wires 5 which are of indefinite length as contrasted with endless rings and arranging these at a suitable distance apart, corresponding to the transverse measurement of the tire from bead to bead across the tread, I wrap about them in zigzag relation a strip 7 comprising a series of parallel cords 9 side by side. This strip may conveniently be formed of such cords embedded in and secured together by rubber. The width of the strip 7 and the pitch of the windings are preferably so chosen that the edges of adjacent turns touch, as indicated in Fig. 1, and a material is thus provided including two thicknesses of cords, each thickness substantially without break and with the cords of adjacent layers crossing each other. This material may be prepared of indefinite length, conveniently by the process and mechanism disclosed in my application Serial No. 67,465, filed Dec. 17, 1915.

Figure 2:
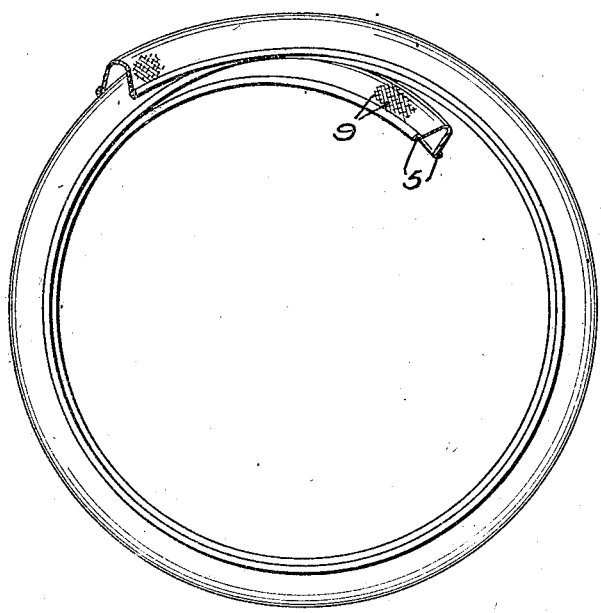
Fig. 2 is a view illustrating how the tire body is built up from such material.
Figure 3:
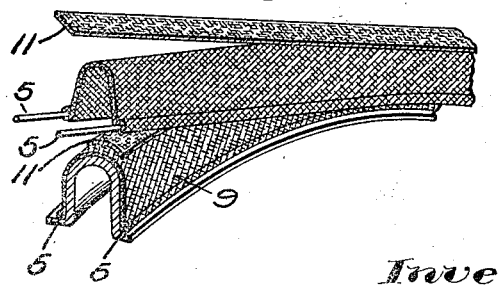
Fig. 3 is a fragmentary perspective view of the tire body with the layers separated to disclose the construction.

To construct a tire in accordance with my invention I take a suitable length of this material greater than the circumference of the desired tire and coil it around a suitable former, the strands 5 coming at the beads of the proposed tire, as indicated in Fig. 3, and the middle portion of the strip being curved outwardly between the beads to tire form. The strip is wound around in a number of convolutions, each lying wholly exterior to the preceding, as indicated in Fig. 2 and I have there shown somewhat more than two such convolutions, this being for the purpose of graphic illustration. It will be understood that preferably the winding is continued to provide a substantially uniform thickness for the tire body.

After a body or suitable thickness has been built up as described, the tire may be treaded and cured in the usual manner. A tire constructed as described may have any desired number of thicknesses of cords and it will be noted by referring to Fig. 3 that the direction of the cords in adjacent layers, whether of the the same turn of strip or of adjacent turns, is crossed and there is no danger of the cords of one layer working in and separating the cords of another layer. The bead portions are built up of several turns of the edge strands 5 and the body-forming strands 9 extend continuously through the various turns or convolutions of the body-forming strip. Joints in the body of the tire are thus eliminated and the cords will not become loose and separate.

In accordance with my invention I may, while winding up the tire in the manner suggested by Fig. 2, lead in between the layers reinforcing strips 11, shown in Fig. 3. Such strips, whether of rubber or of fabric-reinforced rubber, will distribute the pressure of the cords and minimize relative wear thereof between adjacent layers of the tire. The addition of such strips is made possible by the construction of the tire from a continuous strip prepared as shown in Fig. 1, wound upon itself as shown in Fig. 2, it being merely necessary to lead the strips in and coil them around the former while the cord strip shown in Fig. 1 is being so coiled.

Having thus described my invention, what I claim as new and desire to secure by Letters Patent is:—

1. A tire having a body portion including lateral strands and parallel rubber-covered cords wound in zigzag relation about said strands to provide a band, said band being coiled on itself circumferentially in a number of turns.

2. A tire having a body portion including lateral strands and parallel rubber-covered cords wound in zigzag relation about said strands to provide a band, said band being coiled on itself circumferentially in a number of turns, and reinforcing strips laid between the turns.

3. A tire having a body portion including lateral strands and parallel rubber-covered cords wound in zigzag relation about said strands to provide a band, said band being coiled on itself circumferentially in a number of turns, and a reinforcing strip coiled with the band to provide pressure-distributing turns between the turns of the latter.

4. A tire having a body comprising a set of parallel cords crossing the tire obliquely from bead to bead and continuing unbroken to provide a number of double circumferential plies, each ply lying wholly exterior to the preceding.

5. A tire having bead portions comprising strands wound in a plurality of circumferential turns and continuous body-forming cords extending obliquely back and forth between corresponding turns in succession.

In testimony whereof, I have signed my name to this specification.

HENRY J. DOUGHTY